(12) United States Patent
Mao et al.

(10) Patent No.: US 12,322,420 B2
(45) Date of Patent: Jun. 3, 2025

(54) MIDDLE SHIELDS TWO-DIMENSIONAL MAGNETIC RECORDING READ HEADS

(71) Applicant: Western Digital Technologies, Inc., San Jose, CA (US)

(72) Inventors: Ming Mao, Dublin, CA (US); Chen-Jung Chien, Mountain View, CA (US); Goncalo Marcos Baião De Albuquerque, San Jose, CA (US); Chih-Ching Hu, Pleasanton, CA (US); Yung-Hung Wang, San Jose, CA (US); Ming Jiang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,615

(22) Filed: Jul. 26, 2023

(65) Prior Publication Data
US 2024/0144966 A1 May 2, 2024

Related U.S. Application Data

(60) Provisional application No. 63/421,488, filed on Nov. 1, 2022.

(51) Int. Cl.
*G11B 5/39* (2006.01)
*H01F 10/32* (2006.01)

(52) U.S. Cl.
CPC ....... *G11B 5/3912* (2013.01); *H01F 10/3272* (2013.01)

(58) Field of Classification Search
None
See application file for complete search history.

(56) References Cited

U.S. PATENT DOCUMENTS

| | | | | |
|---|---|---|---|---|
| 7,325,294 | B2 | 2/2008 | Zhou | |
| 8,576,518 | B1 * | 11/2013 | Zeltser | G01R 33/098 360/324.1 |
| 8,638,530 | B1 * | 1/2014 | Hsu | G11B 5/3912 360/324.1 |
| 8,760,819 | B1 * | 6/2014 | Liu | G11B 5/3912 360/319 |
| 8,873,204 | B1 * | 10/2014 | Gao | G11B 5/3912 360/319 |
| 8,970,988 | B1 | 3/2015 | Li et al. | |

(Continued)

*Primary Examiner* — William J Klimowicz
(74) *Attorney, Agent, or Firm* — Patterson + Sheridan, LLP

(57) ABSTRACT

The present disclosure generally relates to a dual free layer two dimensional magnetic recording read head. The read head comprises a first lower shield, a first sensor disposed over the first lower shield, a first upper shield disposed over the first sensor, a read separation gap (RSG) disposed on the first upper shield, a second lower shield disposed over the RSG, a second sensor disposed over the second lower shield, and a second upper shield disposed over the second sensor. In some embodiments, the second lower shield comprises a CoFeHf layer. In another embodiment, the second lower shield is a synthetic antiferromagnetic multilayer comprising a first shield layer, a second shield layer, and a CoFe/Ru/CoFe anti-ferromagnetic coupling layer or a Ru layer disposed therebetween, the first and second shield layers comprising NiFe and CoFe. In yet another embodiment, the second lower shield comprises layers of Ru, IrMn, and NiFe.

13 Claims, 9 Drawing Sheets

(56) References Cited

U.S. PATENT DOCUMENTS

| | | | |
|---|---|---|---|
| 9,042,059 B1* | 5/2015 | Katine | G11B 5/3954 |
| | | | 360/316 |
| 9,087,527 B1 | 7/2015 | Li et al. | |
| 9,190,082 B2 | 11/2015 | Sapozhnikov et al. | |
| 9,401,163 B2* | 7/2016 | McKinlay | G11B 5/29 |
| 9,552,834 B1 | 1/2017 | Sapozhnikov et al. | |
| 9,570,100 B1 | 2/2017 | Freitag et al. | |
| 9,786,305 B1* | 10/2017 | Li | G11B 5/3909 |
| 9,870,791 B1* | 1/2018 | Sapozhnikov | G11B 5/3912 |
| 10,074,387 B1* | 9/2018 | Xiao | G11B 5/3909 |
| 11,087,785 B1* | 8/2021 | Mao | G11B 5/3909 |
| 2015/0062735 A1* | 3/2015 | Sapozhnikov | G11B 5/3948 |
| | | | 360/315 |
| 2015/0062755 A1* | 3/2015 | Sapozhnikov | G11B 5/3951 |
| | | | 360/315 |
| 2016/0005424 A1* | 1/2016 | McKinlay | G11B 5/3909 |
| | | | 360/121 |
| 2016/0336030 A1* | 11/2016 | Xiao | C21D 6/001 |
| 2017/0011759 A1* | 1/2017 | Ge | G11B 5/3932 |
| 2021/0390978 A1* | 12/2021 | Hu | G11B 5/3954 |

* cited by examiner

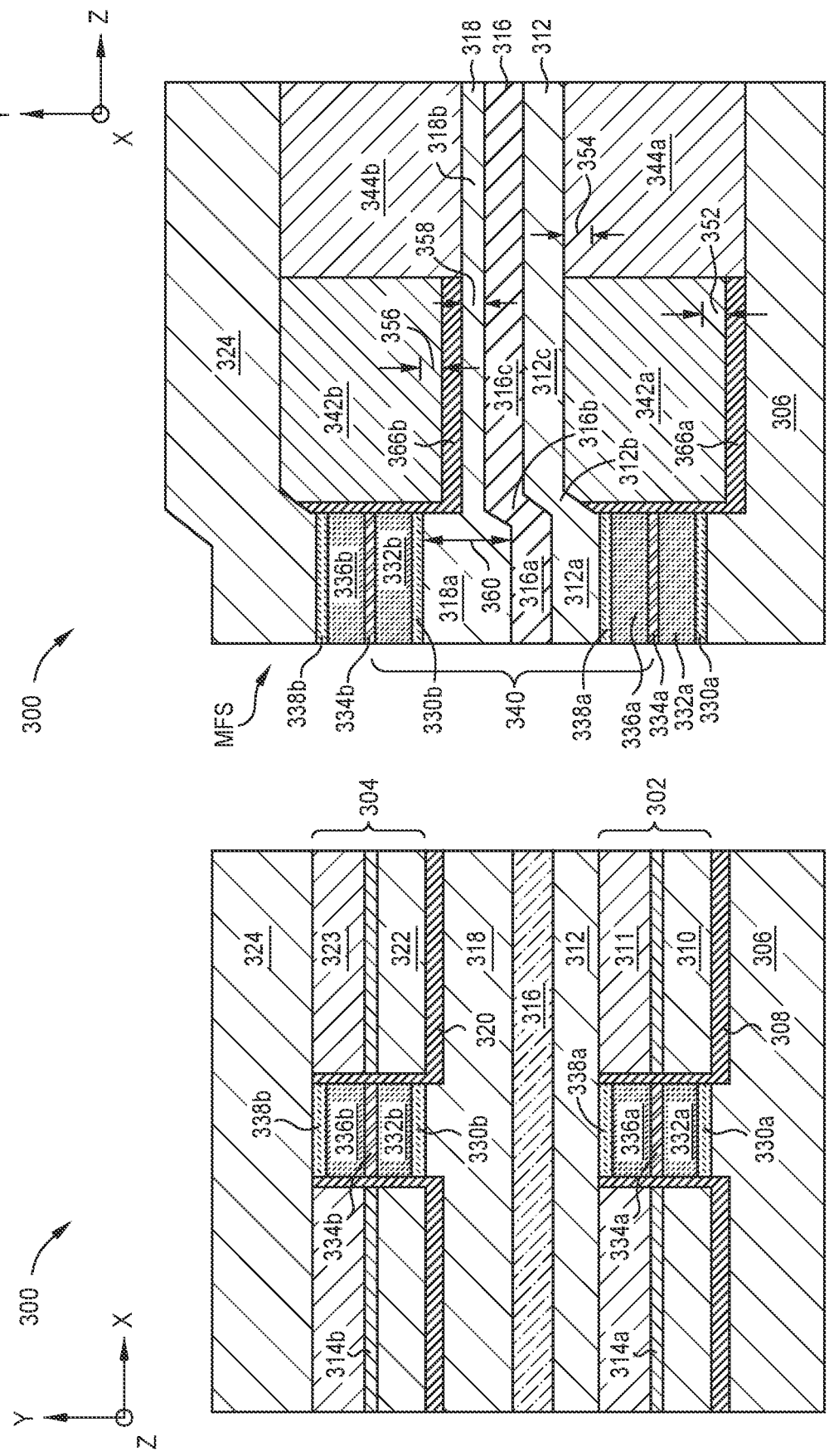

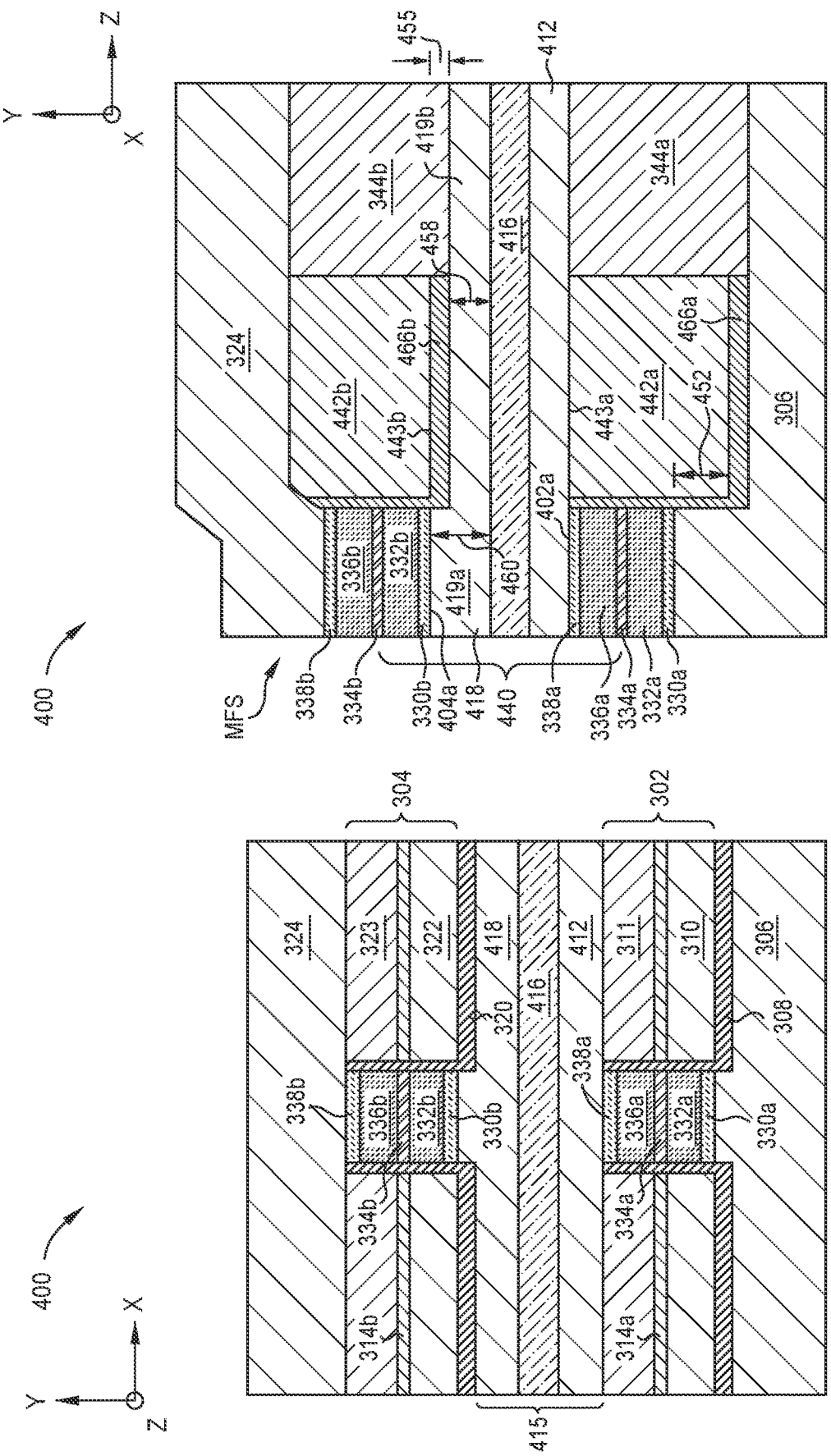

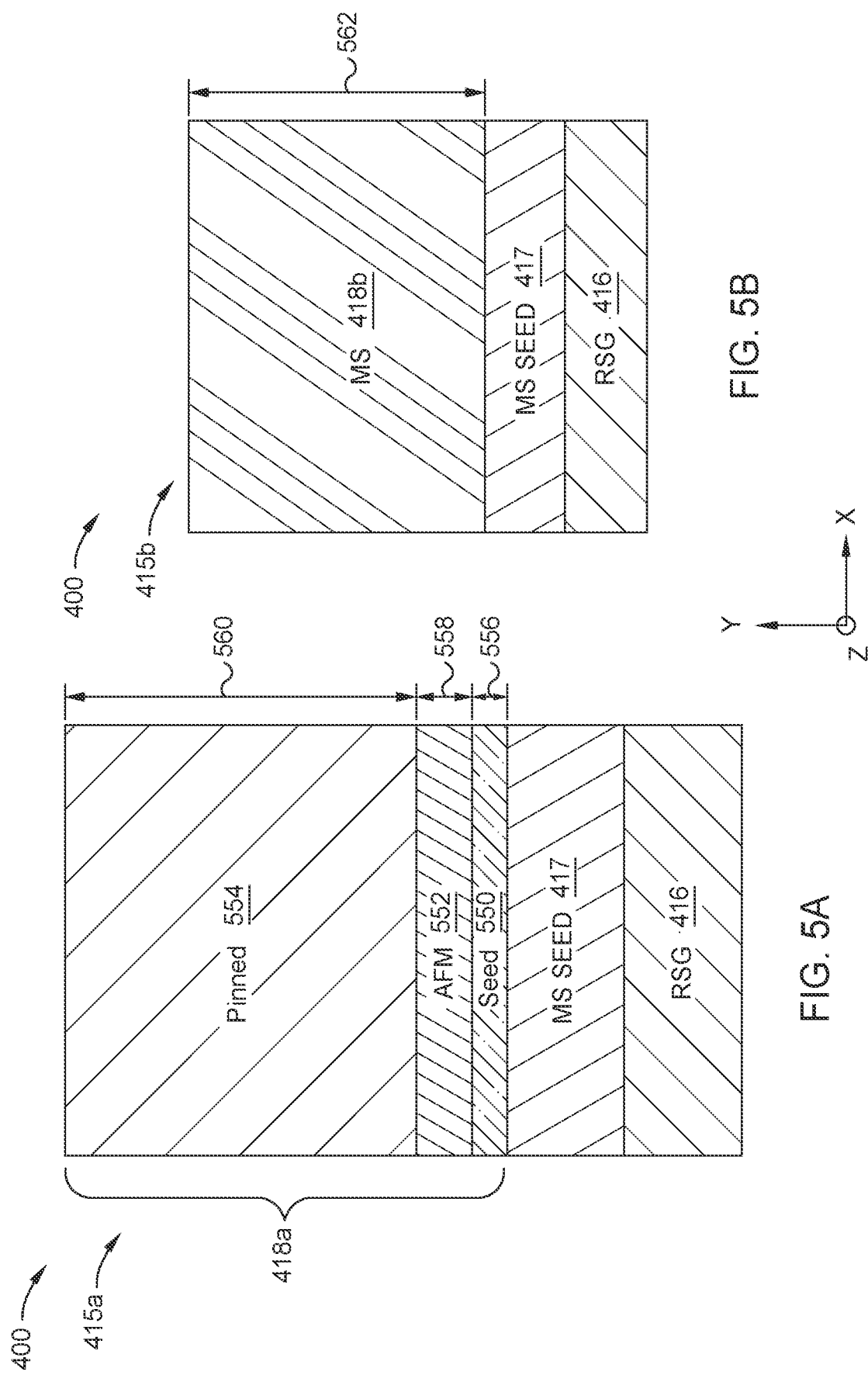

| MS 612 | MS Layers 614 | ΔThk (Å) 616 | $J_{Ru}$ (erg/cm²) 618 | Δm (mem/cm²) 620 |
|---|---|---|---|---|
| 602 | Ru30/NiFe80/CoFe10/Ru8/CoFe10/NiFe260 | 180 | 0.39 | 1.43 |
| 604 | Ru30/NiFe110/Ru8/NiFe215 | 105 | 0.07 | 0.83 |
| 606 | Ru30/NiFe100/CoFe10/Ru8/CoFe10/NiFe205 | 105 | 0.42 | 0.83 |
| 608 | Ru30/NiFe130/CoFe10/Ru8/CoFe10/NiFe175 | 45 | 0.43 | 0.36 |
| 610 | Ru30/NiFe150/CoFe10/Ru8/CoFe10/NiFe155 | 5 | 0.44 | 0.04 |

FIG. 6A

| MS Material | Thickness (Å) | $H_k$ (Oe) |
|---|---|---|
| CoFeHf | 211.4 | 63.2 |
| NiFe | 211 | 4.4 |

FIG. 6B

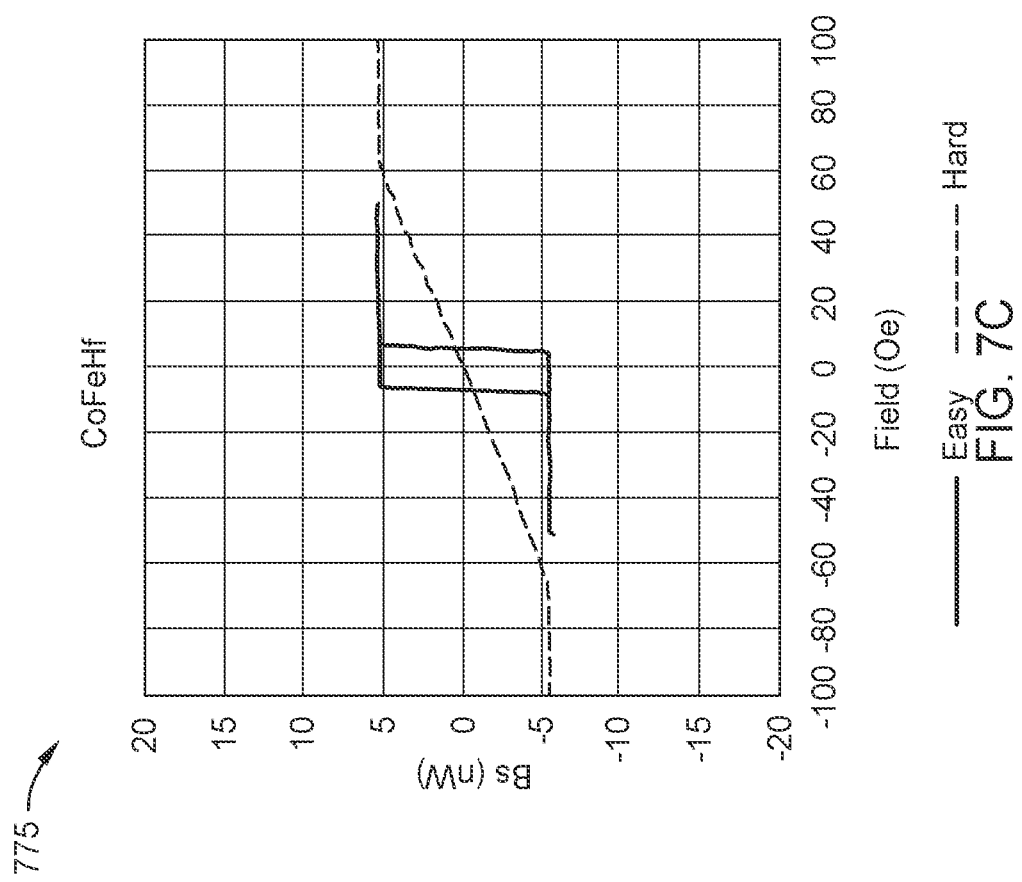

MIDDLE SHIELDS TWO-DIMENSIONAL MAGNETIC RECORDING READ HEADS

CROSS-REFERENCE TO RELATED APPLICATIONS

This application claims benefit of U.S. provisional patent application Ser. No. 63/421,488, filed Nov. 1, 2022, which is herein incorporated by reference.

BACKGROUND OF THE DISCLOSURE

Field of the Disclosure

Embodiments of the present disclosure generally relate to a dual free layer (DFL) two dimensional magnetic recording (TDMR) read head.

Description of the Related Art

Two dimensional magnetic recording (TDMR) read heads generally have a first sensor, oftentimes referred to as a lower reader and a second sensor, oftentimes referred to as an upper reader. The readers each have lower and upper shields with an insulating reader separation gap (RSG) therebetween. Both the top reader and the bottom reader are substantially identical, each comprising two free layers to be dual free layer (DFL) readers or sensors. In DFL reader operation, the two free layers or each reader are individually stabilized longitudinally by an anti-ferromagnetically coupled (AFC) soft bias (SB) and biased transversally by a permanent magnet or a rear hard bias (RHB) structure from the stripe back edge of the sensor.

A transverse bias field of TDMR read heads is determined by the remnant magnetization (Mr) times thickness (t) product (i.e., Mr*t) of the RHB structure. Since a saturation magnetization, Ms, and thus, the Mr of the RHB is quite limited (e.g., as compared to the Ms of the soft bias), a thicker RHB is generally required to achieve the desired transverse bias field. The thicker RHB needed results in an increased topography along the reader stripe height (SH) direction. The large topography poses a challenge to TDMR DFL reader designs, as the large topography limits the read head's capacity in down track spacing (DTS), somewhat offsetting the intrinsic narrow shield-shield (S-S) advantage of DFL readers. A wide DTS can cause the two readers to become misaligned at large skew, thereby limiting the fraction of the disk accessible in TDMR mode. As such, the lower reader and the upper reader may perform asymmetrically with different performance and reliability.

A middle shield (MS) in TDMR read heads serves as both a bottom shield and a bottom lead for the upper reader (UR). The middle shield contributes to down track spacing (DTS) physically, UR performance stability magnetically, and lead resistance electrically. The large topography of the lower reader (LR) and deep over milling (OM) of the UR, specifically from a TDMR dual free layer (DFL) read head, result in an uneven middle shield with varying magnetic shield thicknesses. A single NiFe layer has currently been used for the MS and is not robust magnetically due to its uneven thickness and the nature of NiFe known intrinsically with more magnetic domain activities. While the topography of the LR needs to be improved, a MS with constant magnetic thickness and magnetic robustness has to be used with simplicity for implementation in TDMR read head fabrications.

Therefore, there is a need in the art for an improved TDMR read head.

SUMMARY OF THE DISCLOSURE

The present disclosure generally relates to a dual free layer (DFL) two dimensional magnetic recording (TDMR) read head. The read head comprises a first lower shield, a first sensor disposed over the first lower shield, a first upper shield disposed over the first sensor, a read separation gap (RSG) disposed on the first upper shield, a second lower shield disposed over the RSG, a second sensor disposed over the second lower shield, and a second upper shield disposed over the second sensor. In some embodiments, the second lower shield comprises a layer of CoFeHf. In another embodiment, the second lower shield comprises a first shield layer, a second shield layer, and a Ru layer disposed therebetween, where the first and second shield layers comprising CoFe and NiFe. In another embodiment, the second lower shield comprises a Ru layer, an IrMn layer, and a NiFe layer.

In one embodiment, a read head comprises a first lower shield, a first sensor disposed over the first lower shield, a second sensor disposed over the first sensor, a first upper shield disposed over the second sensor, and a middle shield disposed between the first sensor and the second sensor. The middle shield comprises a second upper shield disposed over the first sensor, a read separation gap disposed on the second upper shield, and a second lower shield disposed between the read separation gap and the second sensor, the second lower shield being a multilayer shield comprising a CoFe/Ru/CoFe anti-ferromagnetic coupling (AFC) layer or a Ru layer.

In another embodiment, a read head comprises a first lower shield, a first sensor disposed over the first lower shield, a first upper shield disposed over the first sensor, a read separation gap disposed on the first upper shield, the read separation gap being substantially planar, a second lower shield disposed over the read separation gap, the second lower shield comprising CoFeHf, a second sensor disposed over the second lower shield, and a second upper shield disposed over the second sensor.

In yet another embodiment, a read head comprises a first lower shield, a first dual free layer (DFL) sensor disposed over the first lower shield, a DFL second sensor disposed over the first DFL sensor, a first upper shield disposed over the second DFL sensor, and a substantially planar middle shield disposed between the first DFL sensor and the second DFL sensor. The substantially planar middle shield comprises a second upper shield disposed over the first DFL sensor, a read separation gap disposed on the second upper shield, a seed layer disposed on the read separation gap, the seed layer comprising Ru, NiFe, NiCr, $SiO_2$, or combinations thereof, and a second lower shield disposed between and in contact with the seed layer and the second DFL sensor, the second lower shield being a multilayer shield comprising a first shield layer disposed on the seed layer, a CoFe/Ru/CoFe anti-ferromagnetic coupling (AFC) layer or a Ru layer disposed on the first shield layer, and a second shield layer disposed on the AFC layer or the Ru layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B illustrate various views of a conventional dual free layer (DFL) read head comprising two sensors or readers, according to one embodiment.

FIGS. 4A-4B illustrate various views of a DFL TDMR read head comprising two sensors or readers, according to various embodiments.

FIGS. 5A-5D illustrate various embodiments of middle shields utilized in the read head of FIGS. 4A-4B.

FIG. 6A illustrates a chart comparing various middle shields, according to one embodiment.

FIG. 6B illustrates a chart comparing a middle shield comprising CoFeHf to a conventional middle shield comprising only NiFe, according to one embodiment.

FIGS. 7A-7C illustrate magnetic hysteresis (M-H) loops comparing the saturated magnetization (Bs) in nW versus the magnetic field in Oe, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer (DFL) two dimensional magnetic recording (TDMR) read head. The read head comprises a first lower shield, a first sensor disposed over the first lower shield, a first upper shield disposed over the first sensor, a read separation gap (RSG) disposed on the first upper shield, a second lower shield disposed over the RSG, a second sensor disposed over the second lower shield, and a second upper shield disposed over the second sensor. In some embodiments, the second lower shield comprises a layer of CoFeHf. In another embodiment, the second lower shield comprises a first shield layer, a second shield layer, and a Ru layer disposed therebetween, where the first and second shield layers comprising CoFe and NiFe. In another embodiment, the second lower shield comprises a Ru layer, an IrMn layer, and a NiFe layer.

Figure 1:
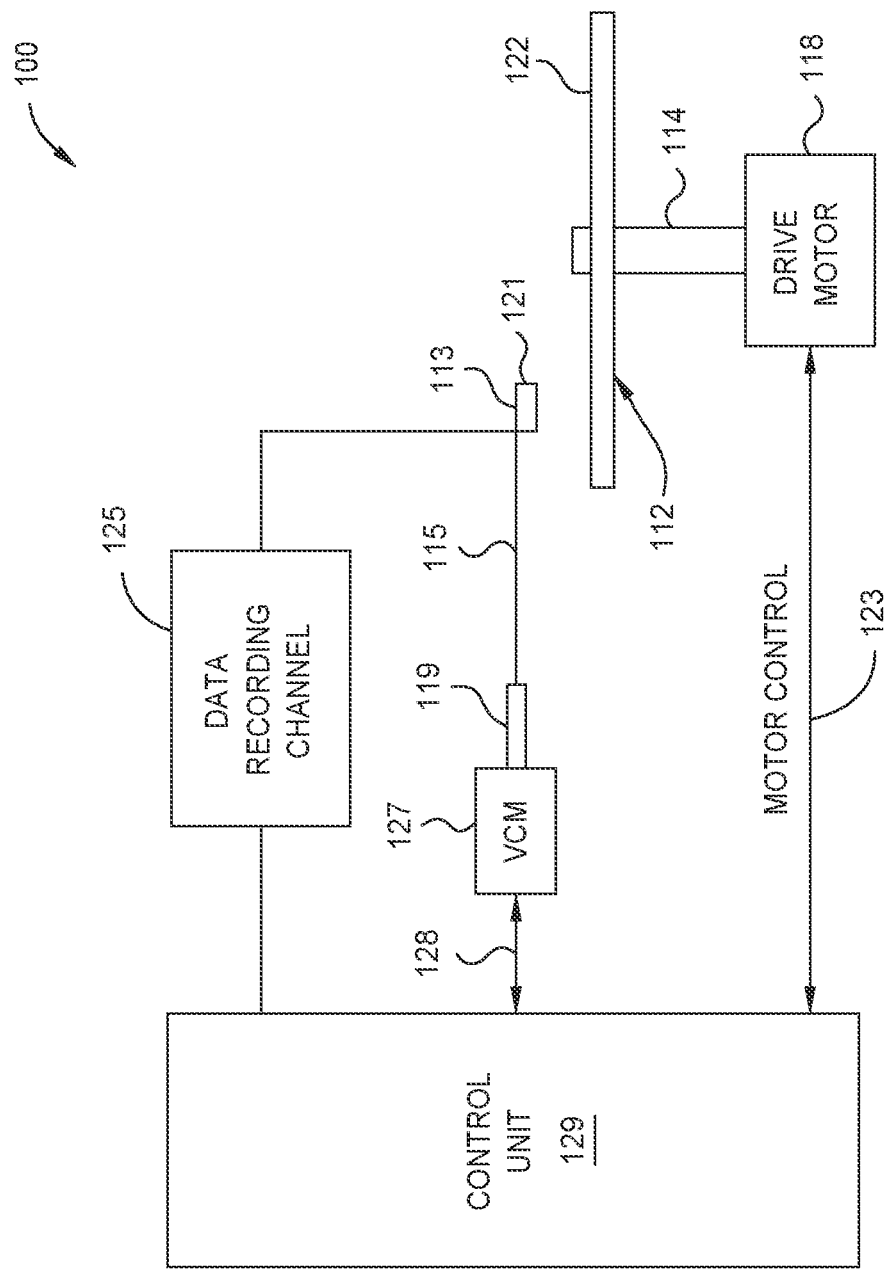
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
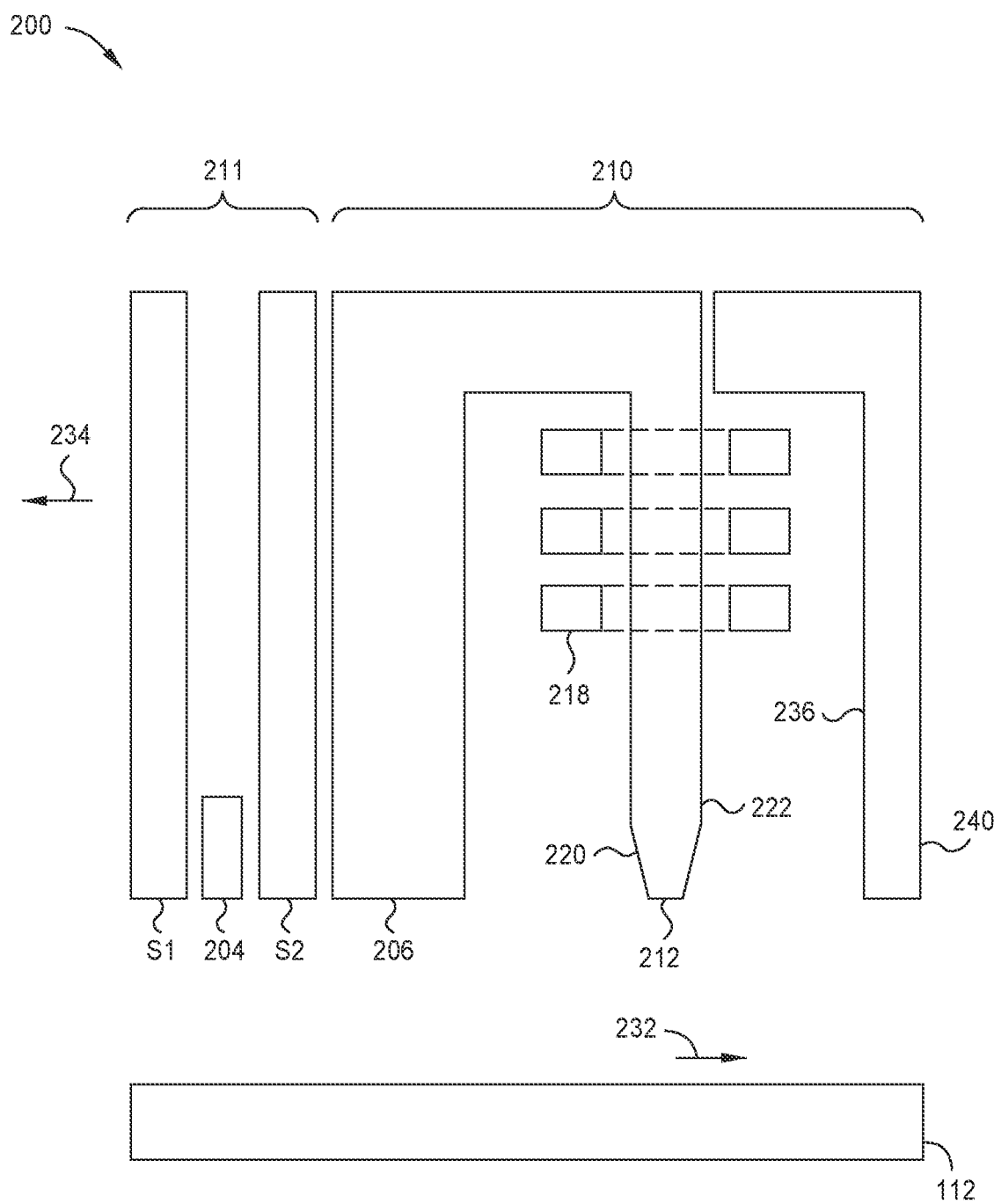
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT differential reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

FIGS. 3A-3B illustrate various views of a conventional dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300.

The DFL TDMR read head 300 comprises a first lower shield 306, a first insulation layer 308 disposed on the first shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316, a second insulation layer 320 disposed on the second lower shield 318, a second sensor or reader 304 disposed on the second lower shield 318 between portions of the second insulation layer 320, and a second upper shield 324 disposed over the second sensor 304. The RSG 316 may comprise AlOx, where x is an integer greater than or equal to 1. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

A first soft bias layer 310 is disposed on the first insulation layer 308 for the first reader 302 and an anti-ferromagnetically coupled (AFC) layer 314a is disposed between the first soft bias layer 310 and a second soft bias layer 311. Similarly, a first soft bias layer 322 is disposed on the first insulation layer 320 for the second reader and an AFC layer 314b is disposed between the first soft bias layer 322 and a second soft bias layer 323. The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 322, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 90 nm to about 95 nm. A first rear hard bias (RHB) structure 342a is disposed behind the first reader 302, recessed from the MFS in the z-direction. A second insulation layer 366a is disposed between the first RHB structure 342a and the first reader 302, and between the first RHB structure 342a and the first lower shield 306. A third insulation layer 344a is disposed behind the first RHB structure 342a. The first RHB structure 342a and the second insulation layer 366a extend above the first sensor 302 a distance 354 in the y-direction of about 10 nm to about 15 nm. The first RHB structure 342a and the second insulation layer 366a extend below the first sensor 302 a distance 352 in the −y-direction of about 5 nm to about 10 nm. The first, second, and third, insulation layers 308, 366a, and 344a may each individually comprise MgO, AlOx, SiNx, SiOx and their laminates, where x is an integer greater than or equal to 1.

A second RHB structure 342b is disposed behind the second reader 304, recessed from the MFS in the z-direction. A second insulation layer 366b is disposed between the second RHB structure 342b and the second reader 304, and between the second RHB structure 342b and the second lower shield 318. The third insulation layer 344b is disposed behind the first RHB structure 342b. The second RHB structure 342b extends below the second sensor 304 a distance 356 in the −y-direction of about 5 nm to about 10 nm. The first RHB structure 342a and the second insulation layer 366a extending above the first sensor 302 the distance 354, and the second RHB structure 342b extending below the second sensor 304 the distance 356, causes the DTS between the sensors 302, 304 to widen in the y-direction.

Because the first RHB structure 342a and the second insulation layer 366a extend above the first sensor 302 the distance 354, neither the RSG 316 nor the first upper shield 312 is linear in the z-direction. As a result, the RSG 316 comprises a first portion 316a disposed at the MFS extending in the z-direction, a second portion 316b extending in the yz-direction, and a third portion 316c extending in the z-direction that is unaligned with the first portion 316a in the y-direction. Similarly, the first upper shield 312 comprises a first portion 312a disposed at the MFS extending in the z-direction, a second portion 312b extending in the yz-direction, and a third portion 312c extending in the z-direction that is unaligned with the first portion 312a in the y-direction. Additionally, the second lower shield 318 varies in thickness in the y-direction. A first portion 318a of the second lower shield 318 aligned with the second sensor 304 in the y-direction has a first thickness 360 of about 30 nm to about 35 nm greater than a second thickness 358 of about 10 nm to about 15 nm of a second portion 318b of the second lower shield 318 disposed between the RSG 316 and the second insulation layer 366b.

FIGS. 4A-4B illustrate various views of a DFL TDMR read head 400 comprising two sensors or readers 302, 304, according to one embodiment. FIG. 4A illustrates an MFS view of the DFL TDMR read head 400, and FIG. 4B illustrates a cross-sectional view of the DFL TDMR read head 400. The DFL TDMR read head 400 of FIGS. 4A-4B may be within the disk drive 100 of FIG. 1. The DFL TDMR read head 400 of FIGS. 4A-4B may be the magnetic read head 211 of FIG. 2. The DFL TDMR read head 400 is similar to the DFL TDMR read head 300 of FIGS. 3A-3B; however the first RHB structure 442a, the second insulation layer 466a, the first upper shield 412, the RSG 416, the second lower shield 418, the second RHB structure 442b, and the second insulation layer 466b vary. The first upper shield 412, the RSG 416, the second lower shield 418 may collectively be referred to herein as middle shields 415.

Like the DFL TDMR read head 300 of FIGS. 3A-3B, the DFL TDMR read head 400 comprises the first sensor or reader 302 and the second sensor or reader 304. A first upper shield 412 is disposed over the first reader 302 and the second soft bias layer 311. As shown in FIG. 4B, a first surface 443a of the first RHB structure 442a disposed adjacent to the first upper shield 412 is substantially flush or aligned with a first surface 402a of the first reader 302. In other words, the first RHB structure 442a and the second insulating layer 466a are substantially flush or aligned with the top surface 402a of the cap layer 338a of the first sensor 302 in the z-direction. Similarly, a first surface 443b of the second RHB structure 442b is substantially flush or aligned with a first surface 404a of the second reader 304 in the z-direction. In other words, the second RHB structure 442b is substantially flush or aligned with the bottom surface 404a of the seed layer 330b of the second sensor 304 in the z-direction.

Rather than the first RHB structure 442a extending above the first reader 302 in the y-direction, the first RHB structure 442a is recessed further into the first lower shield 306 in the −y-direction than the first RHB structure 342a of the DFL TDMR read head 300 of FIGS. 3A-3B. The first RHB structure 442a of the read head 400 is recessed into the first lower shield 306 a distance 452 of about 15 nm to about 20 nm, which is greater than the distance 352 of FIGS. 3A-3B. Because the first RHB structure 442a is substantially flush or aligned with the first reader 302, the first upper shield 412 and the RSG 416 of the DFL TDMR read head 400 each extends substantially linearly along the z-axis from the MFS into the read head 400 such that the first upper shield 412 and the RSG 416 are planar.

Additionally, because the first upper shield 412 and the RSG 416 of the DFL TDMR read head 400 are each planar or extend substantially linearly along the z-axis, the second lower shield 418 comprises only two portions. As shown in FIG. 4B, a first portion 419a of the second lower shield 418 disposed at the MFS adjacent to the second reader 304 has a first thickness 460 in the y-direction of about 20 nm to about 30 nm, and a second portion 419b of the second lower shield 418 disposed between the RSG 416 and the second insulation layer 444b has a second thickness 458 in the y-direction of greater than or equal to about 10 nm, such as about 15 nm to about 20 nm.

Comparing the second lower shield 418 of the read head 400 to the second lower shield 318 of the read head 300, the first thickness 360 of the first portion 318a of the second lower shield 318 of the read head 300 and the second thickness 358 of the second portion 318b of the second lower shield 318 of the read head 300 differ in thickness by about 15 nm to about 25 nm. However, the first portion 419a and the second portion 419b of the second lower shield 418 of the read head 400 only differ in thickness by about 5 nm to about 10 nm. As such, the DTS 440 between the first sensor 302 and the second sensor 304 in the read head 400 is between about 75 nm to about 85 nm, which is less than the DTS 340 of the DFL TDMR read head 300 of FIGS. 3A-3B.

Because the first surface 443a of the first RHB structure 442a is aligned with the first surface 402a of the first sensor 302, and because the first surface 443b of the second RHB structure 442b is aligned with the first surface 404a of the second sensor 304, the first and second sensors or readers 302, 304 are physically asymmetric, where a bulk or majority of the first RHB structure 442a is disposed below (i.e., the −y-direction) the first sensor 302, and where a bulk or majority of the second RHB structure 442b is disposed above (i.e., the y-direction) the second sensor 304. As such, the DTS 440 between the first and second readers 302, 304 is decreased, enabling a larger fraction of the disk to be operated in TDMR mode hence improving the performance and reliability, both magnetically and electronically, of the read head 400.

FIGS. 5A-5D illustrate MFS views of various embodiments of middle shields 415a, 415b, 415c, 415d utilized in the read head 400 of FIGS. 4A-4B. Each middle shield 415a, 415b, 415c, 415d of FIGS. 5A-5D may be individually used as the middle shield 415 in the read head 400 of FIGS. 4A-4B. While not shown in FIGS. 5A-5D, each middle shield 415a, 415b, 415c, 415d may further comprise the first upper shield 412 of FIGS. 4A-4B disposed below the RSG 416. In some embodiments, each middle shield 415a, 415b, 415c, 415d may be the second lower shield 418 of the read head 400 of FIGS. 4A-4B.

The middle shield 415a of FIG. 5A illustrates an embodiment of a pinned middle shield 415a. The pinned middle shield 415a comprises the RSG 416, a middle shield (MS) seed layer 417 disposed on the RSG 416, and a multilayer shield 418a disposed on the MS seed layer 417. The multilayer shield 418a may be the second lower shield 418 of FIGS. 4A-4B. The RSG 416 may comprise $Al_2O_3$. The MS seed layer 417 may comprise two layers, an underlayer serving as chemical mechanical polishing (CMP) stopping layer during the planarization post MS seed depositions, and a seed layer composed of magnetic or non-magnetic metallic materials. A Ru/NiFe bilayer is used as a MS seed layer 417 in one embodiment, where Ru is used as an underlayer and NiFe is used as is the seed layer. The underlayer of the MS seed layer 417 can also be Ru and/or $SiO_2$, and may have a thickness in the y-direction of about 20 Å to about 30 Å. The seed layer of the MS seed layer 417 can also be NiFe and/or NiCr, and may have a thickness in the y-direction of about 80 Å to about 150 Å. In some embodiments, the MS seed layer 417 may be considered part of the multilayer shield 418a.

The multilayer shield 418a comprises a seed layer 550 disposed on the MS seed layer 417, an antiferromagnetic (AFM) layer 552 disposed on the seed layer 550, and a pinned layer 554 disposed on the AFM layer 552. The seed layer 550 comprises Ta, Ru, NiCr, or NiFe, or combinations thereof, the AFM layer 552 comprises IrMn, and the pinned layer 554 comprises NiFe, Co, CoFe, or combinations thereof. The seed layer 550 has a thickness 556 in the y-direction of about 15 Å to about 30 Å, the AFM layer 552 has a thickness 558 in the y-direction of about 40 Å to about 60 Å, and the pinned layer 554 has a thickness 560 in the y-direction of about 150 Å to about 300 Å.

The middle shield 415b of FIG. 5B comprises the RSG 416, the MS seed layer 417 disposed on the RSG 416, and a shield 418b disposed on the MS seed layer 417. The shield 418b may be the second lower shield 418 of FIGS. 4A-4B. The RSG 416 may comprise $Al_2O_3$. The MS seed layer 417 may comprise a Ru/NiFe bilayer in one embodiment, and a NiCr single layer in another embodiment. The thickness of the MS seed layer 417 may have a thickness in the y-direction of about 50 Å to about 150 Å. In some embodiments, the MS seed layer 417 may be considered part of the shield 418b. As a comparison, a shield (like the shield 418b shown) comprises NiFe in prior art. The shield 418b can also comprise CoFeHf in another embodiment. The shield 418b has a thickness 562 in the y-direction of about 200 Å to about 250 Å. CoFeHf is magnetically soft due to being amorphous or microcrystalline in nature. CoFeHf has a high anisotropic magnetic field (Hk). For example, as shown below in the chart 650 of FIG. 6B, CoFeHf has a Hk of about 63 Oe, whereas NiFe has a Hk of about 4 Oe.

Figures 5C, 5D:
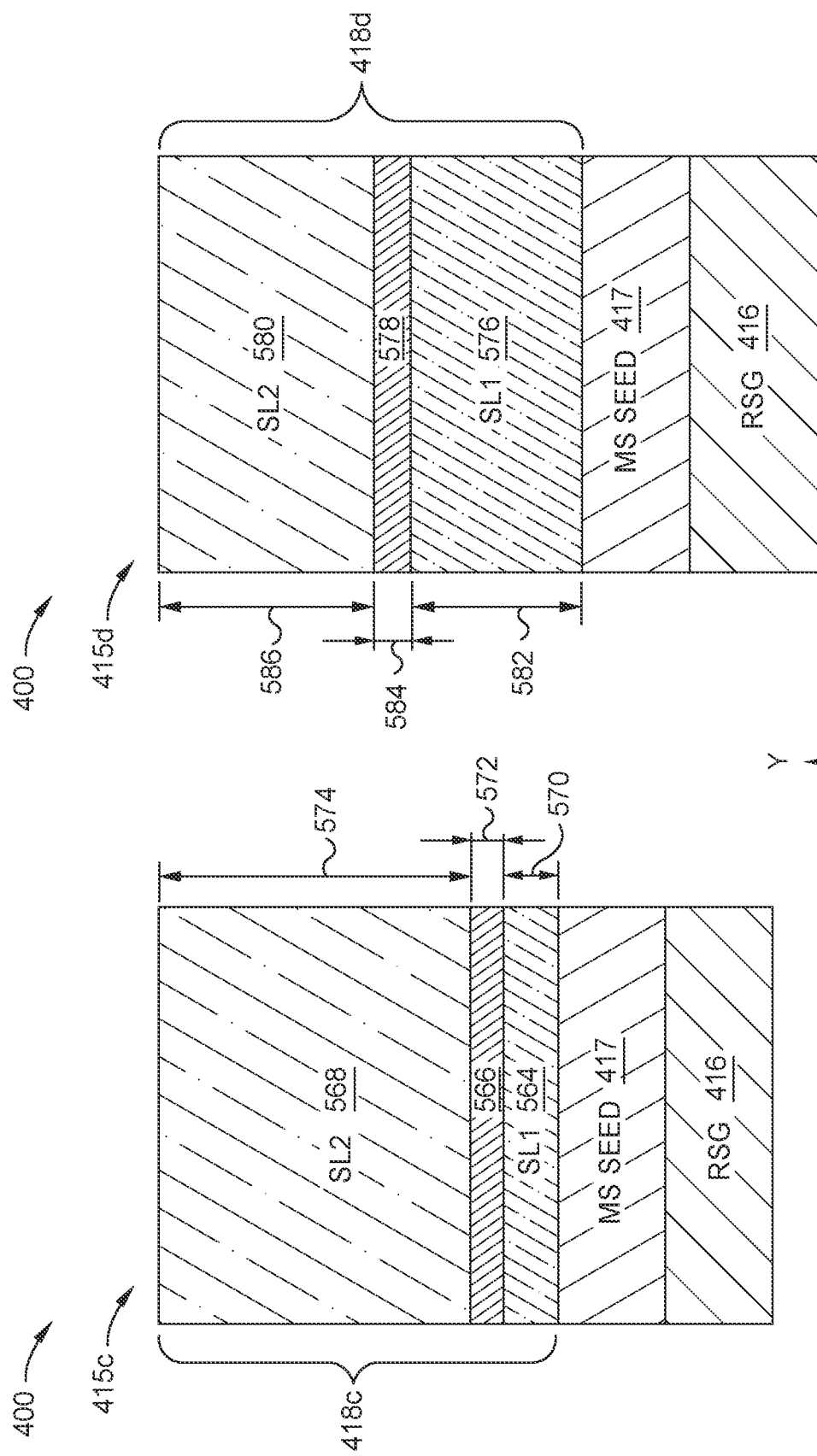

The middle shield 415c of FIG. 5C comprises the RSG 416, the MS seed layer 417 disposed on the RSG 416, and a synthetic antiferromagnetic (SAF) multilayer shield 418c disposed on the MS seed layer 417. The multilayer shield 418c may be the second lower shield 418 of FIGS. 4A-4B. The RSG 416 may comprise $Al_2O_3$. The MS seed layer 417 may comprise Ru/NiFe, Ru/NiCr, $SiO_2$/NiFe, or $SiO_2$/NiCr bilayers, or NiCr as a single layer. The Ru or $SiO_2$ underlayer of the MS seed layer 417 may have a thickness in the y-direction of about 20 Å to about 30 Å, and the NiFe or NiCr seed layer of the MS seed layer 417 may have a thickness in the y-direction of about 40 Å to about 70 Å. In some embodiments, the MS seed layer 417 may be considered part of the multilayer shield 418c.

The multilayer shield 418c comprises a first shield layer (SL1) 564, an anti-ferromagnetic coupling (AFC) layer or a single Ru layer 566 disposed on the first shield layer 564, and a second shield layer (SL2) 568 disposed on the AFC layer or the Ru layer 566. The SL1 564 comprises NiFe, CoFe, and/or combinations thereof, and has a total thickness 570 in the y-direction of about 40 Å to about 60 Å. The layer 566 comprises an AFC CoFe/Ru/CoFe trilayer, or a Ru single layer and has a thickness 572 in the y-direction of about 28 Å, with about 10 Å for each CoFe layer, and about 8 Å for the Ru layer. The SL2 568 comprises NiFe, CoFe, and combinations thereof, and has a total thickness 574 in the y-direction of about 150 Å to about 200 Å.

The middle shield 415d of FIG. 5D comprises the RSG 416, the MS seed layer 417 disposed on the RSG 416, and a SAF multilayer shield 418d disposed on the MS seed layer 417. The multilayer shield 418d may be the second lower shield 418 of FIGS. 4A-4B. The RSG 416 may comprise $Al_2O_3$. The MS seed layer 417 may comprise Ru/NiFe, Ru/NiCr, $SiO_2$/NiFe, or $SiO_2$/NiCr bilayers, or a NiCr single layer. The Ru or $SiO_2$ underlayer of the MS seed layer 417 may have a thickness in the y-direction of about 20 Å to 30 Å, and the NiFe or NiCr seed layer of the MS seed layer 417 may have a thickness in the y-direction of about 40 Å to about 70 Å. In some embodiments, the MS seed layer 417 may be considered part of the multilayer shield 418d.

The multilayer shield 418d comprises a first shield layer (SL1) 576, an anti-ferromagnetic coupling (AFC) layer or a single Ru layer 578 disposed on the first shield layer 576, and a second shield layer (SL2) 580 disposed on the AFC layer or the Ru layer 578. The SL1 576 comprises NiFe, CoFe, and/or combinations thereof, and has a total thickness 582 in the y-direction of about 90 Å to about 110 Å. The layer 578 comprises an AFC CoFe/Ru/CoFe trilayer or a Ru single layer, and has a thickness 584 in the y-direction of about 28 Å, with about 10 Å for each CoFe layer and about 8 Å for the Ru layer. The SL2 580 comprises NiFe, CoFe, and/or combinations thereof, and has a total thickness 586 in the y-direction of about 120 Å to about 160 Å. The multilayer shield 418d of FIG. 5D varies from the multilayer shield 418c of FIG. 5C in that the SL1 576 of multilayer shield 418d is much larger than the SL1 564, where the thickness 582 of the SL1 576 of multilayer shield 418d is about equal to the thickness 586 of the SL2 580.

Each middle shield 415a, 415b, 415c, and 415d of FIGS. 5A-5D is magnetically robust and have a high magnetic anisotropy. Multilayer shields 415c and 415d are two variations from one embodiment of a SAF middle shield with different AFC positions or Ru positions along the y-direction. As such, read heads utilizing one of the middle shields 415a, 415b, 415c, and 415d have improved signal to noise ratios, error rates and higher areal density capacities (ADC).

FIG. 6A illustrates a chart 600 comparing various SAF middle shields 602, 604, 606, 608, 610, according to one embodiment, with the middle shield seed layer being considered part of the middle shields. Each of the middle shields

602, 604, 606, 608, 610 shown in the chart 600 may be individually utilized in the read head 400 of FIGS. 4A-4B.

The chart 600 compares various different embodiments of middle shields 602-610 that are each magnetically robust and have a high magnetic anisotropy. In each middle shield 602-610, the first Ru layer and a portion of the first NiFe layer may be the MS seed layer 417 of FIGS. 5A-5D. Middle shields 602, 606, 608, and 610 are similar; however, the thicknesses of the various NiFe layers within each vary.

The middle shield 602 comprises a first Ru layer of about 30 Å, a first NiFe layer of about 80 Å disposed on the first Ru layer, a first CoFe layer of about 10 Å disposed on the first NiFe layer, a second Ru layer of about 8 Å disposed on the first CoFe layer, a second CoFe layer of about 10 Å disposed on the second Ru layer, and a second NiFe layer of about 260 Å disposed on the second CoFe layer. The middle shield 602 may be the middle shield 415c of FIG. 5C, where the second Ru layer is the Ru layer 566. The middle shield 604 comprises a first Ru layer of about 30 Å, a first NiFe layer of about 110 Å disposed on the first Ru layer, a second Ru layer of about 8 Å disposed on the first NiFe layer, and a second NiFe layer of about 215 Å disposed on the second Ru layer.

The middle shield 606 comprises a first Ru layer of about 30 Å, a first NiFe layer of about 100 Å disposed on the first Ru layer, a first CoFe layer of about 10 Å disposed on the first NiFe layer, a second Ru layer of about 8 Å disposed on the first CoFe layer, a second CoFe layer of about 10 Å disposed on the second Ru layer, and a second NiFe layer of about 205 Å disposed on the second CoFe layer. The middle shield 608 comprises a first Ru layer of about 30 Å, a first NiFe layer of about 130 Å disposed on the first Ru layer, a first CoFe layer of about 10 Å disposed on the first NiFe layer, a second Ru layer of about 8 Å disposed on the first CoFe layer, a second CoFe layer of about 10 Å disposed on the second Ru layer, and a second NiFe layer of about 175 Å disposed on the second CoFe layer. The middle shield 610 comprises a first Ru layer of about 30 Å, a first NiFe layer of about 150 Å disposed on the first Ru layer, a first CoFe layer of about 10 Å disposed on the first NiFe layer, a second Ru layer of about 8 Å disposed on the first CoFe layer, a second CoFe layer of about 10 Å disposed on the second Ru layer, and a second NiFe layer of about 155 Å disposed on the second CoFe layer. The middle shield 610 may be the middle shield 415d of FIG. 5D, where the second Ru layer is the Ru layer 578.

In the chart 600, column 612 identifies the middle shields 602-610, column 614 shows the various film layers of each middle shield 602-610 and their respective thicknesses in Å, column 616 shows a change in thickness (ΔThk) in Å between the second and the first NiFe layers, column 618 shows the antiferromagnetic coupling strength ($J_{Ru}$) in erg/cm$^2$, and column 620 shows the net moment (Δm) between the second and the first NiFe layers in memu/cm$^2$.

As shown in column 618, middle shield 604, which does not comprise any CoFe layers, has the lowest coupling strength of about 0.07 erg/cm$^2$. However, middle shields 602, 606, 608, and 610 all have relatively high coupling strengths of around 0.4 erg/cm$^2$. Additionally, middle shield 610, which has the lowest ΔThk also has the lowest Δm, whereas the middle shields 602, 604, and 606 each have a higher Δm and a higher ΔThk. The Δm or the ΔThk of the middle shield is not limited to only positive values, as described by afore-illustrated embodiments, and its value can also be zero or negative in some other embodiments.

FIG. 6B illustrates a chart 650 comparing a middle shield comprising CoFeHf to a conventional middle shield comprising only NiFe, according to one embodiment. The middle shield comprising CoFeHf may be the middle shield 415b of FIG. 5B. As shown in the chart 650, post annealing of the read head, the middle shield comprising CoFeHf has a significantly higher high anisotropic magnetic field (Hk), about 63 Oe, than the middle shield comprising only NiFe, about 4 Oe.

Figures 7A, 7B:
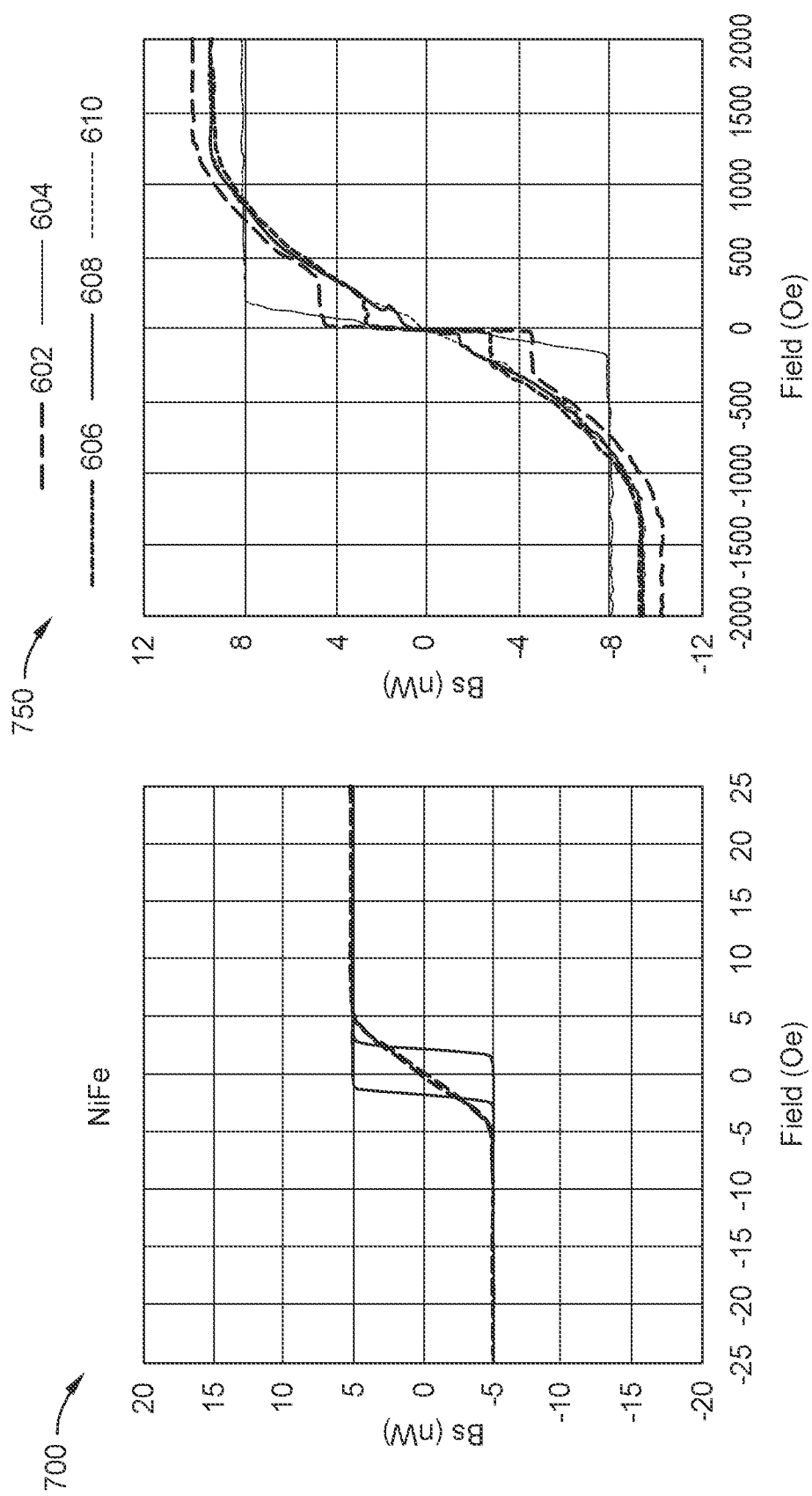

FIGS. 7A-7C illustrate magnetic hysteresis or magnetization versus magnetic field (M-H) loops 700, 750, 775 comparing the saturated magnetization (Bs) in nano Weber (nW) versus the magnetic field in Oe, according to various embodiments. The M-H loop 700 of FIG. 7A illustrates a conventional middle shield comprising only NiFe, like discussed above in FIG. 6B, the M-H loop 750 of FIG. 7B illustrates the middle shields 600-610 of chart 600 of FIG. 6A, and the M-H loop 775 illustrates the middle shield comprising CoFeHf, such as the middle shield 415b of FIG. 5B.

As shown in the M-H loop 700, when a magnetic field is applied, the magnetic response of the conventional middle shield comprising only NiFe is hysteretic along the easy axis and has a magnetic anisotropy field (Hk) about 5 Oe measured along the hard axis. Comparatively, each of the middle shields 602-610 shown in the M-H loop 750 have a non-hysteretic magnetic response with saturation at fields about −100 Oe or about 100 Oe in one embodiment, and about −1300 Oe or about 1300 Oe in other embodiments, and the middle shield comprising CoFeHf shown in the M-H loop 775 has a magnetic anisotropy field of about 60 Oe measured along the hard axis. Thus, each middle shield 602-610 and the middle shield comprising CoFeHf all achieve a higher magnetic anisotropy field than a conventional middle shield comprising only NiFe.

Thus, a middle shield comprising IrMn, a middle shield comprising CoFeHf, and a multilayer middle shield comprising a Ru layer are each magnetically robust and have a high magnetic anisotropy. As such, read heads utilizing one of such middle shields have improved signal to noise ratio, error rates and a higher ADC.

In one embodiment, a read head comprises a first lower shield, a first sensor disposed over the first lower shield, a second sensor disposed over the first sensor, a first upper shield disposed over the second sensor, and a middle shield disposed between the first sensor and the second sensor. The middle shield comprises a second upper shield disposed over the first sensor, a read separation gap disposed on the second upper shield, and a second lower shield disposed between the read separation gap and the second sensor, the second lower shield being a multilayer shield comprising a CoFe/Ru/CoFe anti-ferromagnetic coupling (AFC) layer or a Ru layer.

The second lower shield further comprises a first shield layer and a second shield layer, the AFC layer or the Ru layer being disposed between the first shield layer and the second shield layer. The first shield layer and the second shield layer each individually comprises NiFe, CoFe, and combinations thereof. The second shield layer has a greater thickness than the first shield layer. The first shield layer has a thickness substantially equal to or smaller than the second shield layer. The second upper shield and the read separation gap are substantially planar, extending into the read head substantially perpendicular to a media facing surface. The second lower shield comprises the Ru layer, and the second lower shield further comprises an antiferromagnetic (AFM) layer disposed on the Ru layer, and a pinned layer disposed on the AFM layer. A thickness of the AFM layer is greater than a thickness of the Ru layer, and wherein a thickness of the pinned layer is greater than the thickness of the AFM layer. A magnetic recording device comprises the read head.

In another embodiment, a read head comprises a first lower shield, a first sensor disposed over the first lower shield, a first upper shield disposed over the first sensor, a read separation gap disposed on the first upper shield, the read separation gap being substantially planar, a second lower shield disposed over the read separation gap, the second lower shield comprising CoFeHf, a second sensor disposed over the second lower shield, and a second upper shield disposed over the second sensor.

The read head further comprises a seed layer disposed between the second lower shield and the read separation gap, the second lower shield having a greater thickness than the seed layer. The second lower shield comprises a layer of CoFeHf having a thickness of about 200 Å to about 300 Å. The first sensor and the second sensor are each a dual free layer sensor. The read head further comprises a first rear hard bias (RHB) structure disposed adjacent to the first sensor, the first sensor being disposed at a media facing surface (MFS) and the first RHB structure being recessed from the MFS, and a second RHB structure disposed adjacent to the second sensor, the second sensor being disposed at the MFS and the second RHB structure being recessed from the MFS. The first upper shield, the read separation gap, and the second lower shield are disposed between the first RHB structure and the second RHB structure. A magnetic recording device comprises the read head.

In yet another embodiment, a read head comprises a first lower shield, a first dual free layer (DFL) sensor disposed over the first lower shield, a DFL second sensor disposed over the first DFL sensor, a first upper shield disposed over the second DFL sensor, and a substantially planar middle shield disposed between the first DFL sensor and the second DFL sensor. The substantially planar middle shield comprises a second upper shield disposed over the first DFL sensor, a read separation gap disposed on the second upper shield, a seed layer disposed on the read separation gap, the seed layer comprising Ru, NiFe, NiCr, SiO$_2$, or a combination thereof, and a second lower shield disposed between and in contact with the seed layer and the second DFL sensor, the second lower shield being a synthetic antiferromagnetic multilayer shield comprising a first shield layer disposed on the seed layer, a CoFe/Ru/CoFe anti-ferromagnetic coupling (AFC) layer or a Ru layer disposed on the first shield layer, and a second shield layer disposed on the AFC layer or the Ru layer.

The first shield layer and the second shield layer are each an individually single or multilayer structure comprising NiFe, CoFe, and combinations thereof with the middle shield seed being considered part of the first shield layer. A thickness of the AFC layer or the Ru layer is less than the thickness of the first shield layer. The AFC layer or the Ru layer has a thickness of about 8 Å, the first shield layer has a thickness of about 80 Å to about 160 Å, and the second shield layer has a thickness of about 160 Å to about 260 Å. A magnetic recording device comprises the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a first lower shield;
a first sensor disposed over the first lower shield;
a second sensor disposed over the first sensor, wherein a down-track spacing between the first sensor and the second sensor is about 75 nm to about 85 nm;
a first upper shield disposed over the second sensor; and
a middle shield disposed between the first sensor and the second sensor, the middle shield comprising:
 a second upper shield disposed over the first sensor;
 a read separation gap disposed on the second upper shield, wherein the second upper shield and the read separation gap are substantially planar, extending into the read head substantially perpendicular to a media facing surface (MFS);
 a seed layer disposed on the read separation gap, the seed layer comprising a bilayer of Ru/NiFe, Ru/NiCr, SiO$_2$/NiFe, or SiO$_2$/NiCr, or a single layer of NiCr; and
 a second lower shield disposed between the read separation gap and the second sensor, the second lower shield being a multilayer shield comprising a CoFe/Ru/CoFe anti-ferromagnetic coupling (AFC) layer or a Ru layer, wherein the second lower shield has a first thickness at the MFS and a second thickness recessed from the MFS, the first thickness being greater than the second thickness.

2. The read head of claim 1, wherein the second lower shield further comprises a first shield layer and a second shield layer, the AFC layer or the Ru layer being disposed between the first shield layer and the second shield layer.

3. The read head of claim 2, wherein the first shield layer and the second shield layer each individually comprises NiFe, CoFe, and combinations thereof.

4. The read head of claim 2, wherein the second shield layer has a greater thickness than the first shield layer.

5. The read head of claim 2, wherein the first shield layer has a thickness substantially equal to or smaller than the second shield layer.

6. The read head of claim 1, wherein the second lower shield comprises the Ru layer, and wherein the second lower shield further comprises an antiferromagnetic (AFM) layer disposed on the Ru layer, and a pinned layer disposed on the AFM layer.

7. The read head of claim 6, wherein a thickness of the AFM layer is greater than a thickness of the Ru layer, and wherein a thickness of the pinned layer is greater than the thickness of the AFM layer.

8. A magnetic recording device comprising the read head of claim 1.

9. A read head, comprising:
a first lower shield;
a first dual free layer (DFL) sensor disposed over the first lower shield;
a second DFL sensor disposed over the first DFL sensor, wherein a down-track spacing between the first sensor and the second sensor is about 75 nm to about 85 nm;
a first upper shield disposed over the second DFL sensor; and
a substantially planar middle shield disposed between the first DFL sensor and the second DFL sensor, the substantially planar middle shield comprising:
 a second upper shield disposed over the first DFL sensor;
 a read separation gap disposed on the second upper shield, wherein the second upper shield and the read separation gap are substantially planar, extending into the read head substantially perpendicular to a media facing surface (MFS);

a seed layer disposed on the read separation gap, the seed layer comprising a bilayer of Ru/NiFe, Ru/NiCr, SiO$_2$/NiFe, or SiO$_2$/NiCr, or a single layer of NiCr; and a second lower shield disposed between and in contact with the seed layer and the second DFL sensor, the second lower shield being a multilayer shield comprising:
  a first shield layer disposed on the seed layer,
  a CoFe/Ru/CoFe anti-ferromagnetic coupling (AFC) layer or a Ru layer disposed on the first shield layer, and
  a second shield layer disposed on the AFC layer or the Ru layer, wherein the second lower shield has a first thickness at the MFS and a second thickness recessed from the MFS, the first thickness being greater than the second thickness.

10. The read head of claim 9, wherein the first shield layer and the second shield layer are each an individually multilayer or single layer structure comprising NiFe, CoFe, and combinations thereof.

11. The read head of claim 9, wherein a thickness of the AFC layer or the Ru layer is less than the thickness of the first shield layer.

12. The read head of claim 9, wherein the AFC layer or the Ru layer has a thickness of about 8 Å, the first shield layer has a thickness of about 80 Å to about 160 Å, and the second shield layer has a thickness of about 160 Å to about 260 Å.

13. A magnetic recording device comprising the read head of claim 9.

* * * * *